UNITED STATES PATENT OFFICE 2,440,090

ALPHA-METHYLENE CARBOXYLIC ACID FLUORIDE POLYMERS AND THEIR PREPARATION

Benjamin W. Howk, Wilmington, Del., and Ralph A. Jacobson, Landenburg, Pa., assignors to E. I. du Pont de Nemours & Company, Wilmington, Del., a corporation of Delaware No Drawing. Application May 10, 1944, Serial No. 534,982

2 Claims. (Cl. 260—84)

This invention relates to new acrylyl fluorides and substituted acrylyl fluorides, and to polymers derived therefrom.

Prior art polymeric acid halides, derived from monomeric unsaturated acid chlorides, e. g., methacrylyl chloride, have the disadvantage of poor stability.

Accordingly, this invention has as an object the production of stable polymeric acid halides. A further object is the production of alpha-methylene carboxylic acid fluorides. A still further object is the production of alpha-methylene carboxylic acid fluorides having the general formula

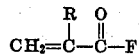

wherein R is hydrogen, halogen or a monovalent hydrocarbon radical. Still further objects are: the production of methacrylyl fluoride; the production of acrylyl fluoride; the polymerization of alpha-methylene carboxylic acid fluorides; the polymerization of said acid fluorides in the absence of another polymerizable compound; the polymerization of said acid fluorides with a polymerizable compound which contains at least one ethylenic linkage; and the polymerization of acrylyl fluoride and of methacrylyl fluoride both in the absence of another polymerizable compound, and with a polymerizable compound which contains at least one ethylenic linkage. Additional objects will become apparent from an examination of the following description and claims.

These and other objects and advantages are accomplished according to the herein described invention which broadly comprises an alpha-methylene carboxylic acid fluoride; and polymers had by polymerizing an alpha-methylene carboxylic acid fluoride alone or with another polymerizable compound which contains at least one ethylenic linkage.

Polymerizable compounds adapted for the preparation of interpolymers with the alpha-methylene carboxylic acid fluorides in accordance with this invention are organic compounds which contain at least one —C=C— double bond which is not present in a benzene nucleus, i. e., at least one ethylenic double bond, said compound having the property of polymerizing to yield high molecular weight compounds, i. e., products having a degree of polymerization greater than a trimer.

By the term "alpha-methylene carboxylic acid fluoride polymer," as employed herein and in the appended claims, we intend to denote generically not only a polymer obtained by polymerizing an alpha-methylene carboxylic acid fluoride free from other polymerizable material, but also an interpolymer of an alpha-methylene carboxylic acid fluoride and one or more other polymerizable compounds which contain at least one ethylenic linkage.

The alpha-methylene carboxylic acid fluorides of this invention are prepared by treating an alpha-methylene carboxylic acid chloride with antimony trifluoride, by heating an alpha-methylene carboxylic acid anhydride with any alkali metal fluoride, preferably potassium fluoride, or by other suitable means. The alpha-methylene carboxylic acid fluorides may be converted to polymers and interpolymers by means of peroxide catalysts, ultraviolet light, heat or other agents that are effective as polymerization catalysts.

The following examples, in which proportions are given in parts by weight unless otherwise specified, are given for illustrative purposes and are not intended to place any restrictions or limitations on the herein described invention.

EXAMPLE I

*Preparation of methacrylyl fluoride from methacrylyl chloride and antimony trifluoride*

A mixture of 206 parts of methacrylyl chloride and 200 parts of freshly powdered antimony trifluoride is heated at water-bath temperature, i. e., 100° C., for 7 hours in a flask fitted with a mercury-sealed stirrer and a reflux condenser. The mixture is allowed to stand overnight and distilled. The methacrylyl fluoride is obtained as a fuming, colorless liquid B. P. 56.5–58° C. Yield 81.5 g. (53%). The compound has a refractive index of $N_D^{25}=1.3703$ and contains 21.0% fluorine. The calculated value for $C_4H_5OF$ is 21.59% fluorine.

In the same manner, acrylyl fluoride and other alpha-methylene carboxylic acid fluorides can be prepared.

EXAMPLE II

*Preparation of methacrylyl fluoride from methacrylic anhydride and potassium fluoride*

In a 500 cc. round-bottomed flask fitted with a condenser and a mercury-sealed stirrer are placed 154 parts of methacrylic anhydride, 116 parts of anhydrous potassium fluoride and 1.54 parts of hydroquinone. The flask is immersed in an oil bath and the latter heated to 100° C. during one hour and to 140° C. during the second hour. Some material refluxes into the condenser, and this is removed by occasionally applying gentle suction and collecting the distillate in a dry ice trap.

After 3 hours at 140° C., 50 parts of methacrylic anhydride is added to reduce the consistency of the mixture. The bath temperature is raised to 160° C. and held there for 1 hour. The material in the trap is allowed to stand over magnesium sulfate for 12 hours, filtered, and distilled. The colorless product boils at 55.8–58° C. Yield 70 parts.

Other alpha-methylene carboxylic acid fluorides such as acrylyl fluoride, alpha-ethyl acrylyl fluoride, and alpha-phenyl acrylyl fluoride can be prepared by the same general procedure.

Example III

*Polymerization of methacrylyl fluoride*

A mixture of 10 parts of methacrylyl fluoride, 0.012 parts of benzoyl peroxide, and 0.006 part of benzoin is exposed to a mercury vapor lamp at room temperature. In 40 hours, about half the liquid has polymerized, and 24 hours later, polymerization is complete. The polymer appears very tough when cut with a knife. The polymer is heated for 24 hours in a vacuum at 60° C. It does not darken, and there is no odor of monomer. The polymer is insoluble in acetone, dioxane, nitromethane, and dimethyl formamide. When molded at 140° C. some discoloration occurs, but films prepared in this way are tough. The softening temperature is 108° C. The polymer is substantially more resistant to heat than is poly-methacrylyl chloride.

Other alpha-methylene carboxylic acid fluorides such as alpha-propyl acrylyl fluoride and acrylyl fluoride can be polymerized in the same manner.

Example IV

*Interpolymerization of methacrylyl fluoride with methyl methacrylate*

A mixture of 25.5 parts of methyl methacrylate, 4.5 parts of methacrylyl fluoride, and 0.06 part of benzoyl peroxide is placed in a container. The air above the mixture is displaced with nitrogen, the container is closed and the mixture heated at 45° C. The mixture solidifies in 18 hours and becomes hard in 42 hours. It is seasoned in a vacuum oven at 60° C. for 15 hours. The yield is 30 parts (100%). This polymer can be molded at 140° C. and 2000 lbs./sq. in. pressure to give tough transparent molded specimens softening at 101° C. The impact strength is 0.55 foot lb./in. notch.

In the same manner acrylyl fluoride can be interpolymerized with methyl methacrylate.

Example V

*Interpolymerization of methacrylyl fluoride and vinyl chloride*

A solution is prepared from 50 parts of petroleum ether, 40 parts of vinyl chloride, 10 parts of methacrylyl fluoride and 0.10 part of benzoyl peroxide. The solution is heated in a closed container for several days and the solvent removed by evaporation. The resultant interpolymer is heated in a vacuum oven at 60° C. overnight. The interpolymer is tough, has a softening temperature of 78° C. and an impact strength of 0.578 ft. lb./in. notch.

Example VI

*Interpolymerization of methacrylyl fluoride with acrylonitrile*

A mixture of 21 parts of acrylonitrile, 9 parts of methacrylyl fluoride, and 0.060 part of benzoyl peroxide is heated at 45° C. The resultant interpolymer is a hard opaque solid.

It is to be understood that the hereinbefore disclosed specific embodiments of this invention may be subject to variation and modification without departing from the scope thereof. For instance, in the preparation of the monomers of this invention, although temperatures of 100° C. and from 100° C. to 160° C. are employed in the processes of Examples I and II, respectively, said temperatures may be varied in either direction. The alpha-methylene carboxylic acid fluorides of this invention may be obtained by any suitable method, as by treating with antimony trifluoride an alpha-methylene carboxylic acid chloride or by treating with potassium fluoride an alpha-methylene carboxylic acid anhydride. Preferably, because of the superior products had therefrom, the alpha-methylene carboxylic acid chloride subjected to treatment with antimony trifluoride contains not more than 9 carbon atoms and has the general formula

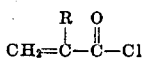

wherein the R substituent is selected from the group consisting of hydrogen and halogen atoms and monovalent hydrocarbon radicals. Similarly, the alpha-methylene carboxylic acid anhydride subjected to treatment with an alkali metal fluoride is preferably one having the general formula

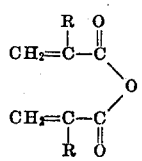

wherein the R substituents are selected from the group consisting of hydrogen and halogen atoms and monovalent hydrocarbon radicals containing up to 6 carbon atoms.

As hereinbefore stated, the novel monomers of this invention are alpha-methylene carboxylic acid fluorides. On account of the superior polymers obtained therewith, the preferred monomeric alpha-methylene carboxylic acid fluorides are those containing not more than 9 carbon atoms and having the general formula

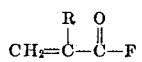

wherein the R substituent is selected from the group consisting of hydrogen and halogen atoms and monovalent hydrocarbon radicals. Included among examples of alpha-methylene carboxylic acid fluorides are: acrylyl fluoride, methacrylyl fluoride, alpha-ethyl acrylyl fluoride, alpha-phenyl acrylyl fluoride, alpha-propyl acrylyl fluoride, alpha-isobutyl acrylyl fluoride, alpha-cyclohexyl acrylyl fluoride, alpha-chloroacrylyl fluoride, alpha-bromoacrylyl fluoride and the like.

Polymerization of alpha-methylene carboxylic acid fluorides may be effected by usual polymerization methods, such as those described below.

(a) Bulk method

The monomers may be polymerized in the absence of a solvent or diluent by means of one of the common polymerization catalysts, such as benzoyl peroxide, lauroyl peroxide, diethyl peroxide, or other catalysts which are soluble in the monomer. Ultraviolet light may be used with the catalyst or in lieu thereof. Photopolymerization catalysts such as benzoin or diacetyl may be used in conjunction with ultraviolet light in the presence or absence of peroxide-type catalysts. In general the rate of polymerization will be proportional to the temperature, faster rates being obtained as the temperature is increased. Optimum results are had when the temperature is within the range of from 35° C. to 40° C. and the catalyst concentration is within the range of from 0.1% to 2% based upon the weight of the monomer.

(b) *Solution method*

The monomer may be polymerized in a solvent such as benzene, acetone, toluene, dioxane, or ethyl acetate in the presence of one of the common polymerization catalysts which is soluble in the particular solvent employed. Ultraviolet light may be used in conjunction with a catalyst or in lieu thereof and if desired a photopolymerization catalyst such as benzoin or diacetyl may also be employed. The rate of polymerization is proportional to the temperature, faster rates being obtained at the higher temperatures. From 0.1% to 2% of catalyst, based upon the weight of the monomer, is the preferred range in view of the superior products obtained therewith.

Broadly speaking, this invention contemplates the production of valuable polymers obtained by polymerizing an alpha-methylene carboxylic acid fluoride, or admixture of alpha-methylene carboxylic acid fluorides, either in the absence of another polymerizable compound or admixed with a polymerizable compound which contains at least one ethylenic linkage. More specifically, this invention comprises polymerizing an alpha-methylene carboxylic acid fluoride with a polymerizable compound which contains at least one ethylenic linkage. Said polymerizable compound may be the alpha-methylene carboxylic acid fluoride itself, i. e., the alpha-methylene carboxylic acid fluoride may be polymerized in the absence of other polymerizable compound, or said polymerizable compound may be another alpha-methylene carboxylic acid fluoride or admixture of other alpha-methylene carboxylic acid fluorides, or said polymerizable compound may be some other polymerizable compound which contains at least one ethylenic linkage, or admixture of said compounds.

Representative polymerizable compounds containing at least one ethylenic linkage are: monoethylenic hydrocarbons, such as ethylene, isobutylene and styrene; polyhalogenated ethylenes, such as 1,1-dichloroethylene, 1,1-difluoroethylene, trifluoroethylene, trifluorochloroethylene and tetrafluoroethylene; vinyl esters of inorganic and organic acids, such as vinyl chloride, vinyl fluoride, vinyl bromide, vinyl formate, vinyl acetate and vinyl benzoate; acrylic acid and methacrylic acid and their esters, nitriles and amides; vinyl ethers, such as vinyl ethyl ether and vinyl butyl ether; vinyl ketones, such as vinyl methyl ketone and methyl isopropenyl ketone; N-vinyl imides, such as N-vinyl succinimide and N-vinyl phthalimide; esters of dicarboxylic acids such as dimethyl fumarate, diethyl maleate and diethyl itaconate; compounds having more than one ethylenic double bond, such as the dienes, e. g., butadiene-1,3, isoprene, 2-chlorobutadiene-1,3, 2-fluorobutadiene-1,3 and 2-cyanbutadiene-1,3; the polyhydric alcohol esters of acrylic and methacrylic acids, e. g., ethylene dimethacrylate, ethylidene dimethacrylate and hexamethylene diacrylate; dimethallyl carbonate and hexamethylene dimethylacrylamide. Of the compounds listed above those containing terminal ethylenic double bonds polymerize more readily and are therefore preferred, and those which contain a single ethylenic double bond are particularly preferred since more soluble products are generally obtained because the possibility of crosslinking is eliminated.

In conducting the process of polymerization of an alpha-methylene carboxylic acid fluoride, either in the absence of or with another polymerizable compound, the bulk and solution processes are preferred. The catalyst concentration is within the range of from 0.1% to 2% based upon the total weight of monomers used. The most effective temperatures lie within the range of from 30° C. to 60° C. since these give high molecular weight products at relatively rapid rates. Greater polymerization speeds are obtainable at higher temperatures but usually with some sacrifice in the molecular weight. It is usually advantageous to displace the air in the systems and in the free space above the mixtures with an inert atmosphere such as nitrogen or carbon dioxide. In the solution process, the ratio of monomers to solvent can be varied in accordance with the principle that higher dilutions result in slower rates and produce lower molecular weight polymers.

When two or more polymerizable monomers are polymerized, the present invention contemplates the addition of the entire amount of the two or more polymerizable compounds to the medium followed by subsequent polymerization. It is well known that the polymerization rates of the monomers operable in this invention may vary to a considerable extent, and it may therefore be found in some cases that the products may be characterized by non-homogeneity and other inferior physical properties. Under these conditions, the polymerization process may be modified by mixing initially all of the more slowly polymerizing material and a small amount of the more rapidly polymerizing material and thereafter adding small portions of the more rapidly polymerizing material at about the rate at which this material is used up.

The isolation of the polymers of this invention will depend upon the method of polymerization employed. When the bulk or casting method of polymerization is employed, the finished polymer is obtained directly and no purification or subsequent treatment is usually necessary other than vacuum drying or seasoning. When the solution method of polymerization is used, the polymer may be isolated by evaporation of the solvent or by pouring the solution into an excess of non-solvent for the polymer, whereby the latter is precipitated. The precipitated polymer may then be thoroughly washed and dried.

When polymerizing an alpha-methylene carboxylic acid fluoride, or admixture of said fluorides, with another polymerizable compound which contains at least one ethylenic linkage, or admixture of said other polymerizable compounds, the ratio of alpha-methylene carboxylic acid fluorides to other polymerizable material may be varied within relatively wide limits. However, the mixture of polymerizable compounds subjected to polymerization should contain at least 5% by weight of an alpha-methylene carboxylic acid fluoride or admixture of said fluorides. Polymeric products superior for most purposes are had when said mixture contains at least 15% by weight of an alpha-methylene carboxylic acid fluoride or admixture of said fluorides; while polymeric products having optimum properties result when said mixture contains more than 25% by weight of an alpha-methylene carboxylic acid fluoride or admixture of said fluorides.

The ratio by weight of alpha-methylene carboxylic acid fluoride to other polymerizable material in the alpha-methylene carboxylic acid fluoride polymers of this invention is at least 5:95. For most purposes, however, said ratio should be at least 15:85; while alpha-methylene carboxylic acid fluoride polymers having optimum properties are those in which said ratio is greater than 25:75.

The alpha-methylene carboxylic acid fluoride polymers of this invention have superior stability and are well adapted to application as film-forming materials. Thus there may be had from said polymers: films which are colorless, strong, tough and flexible; unpigmented and pigmented emulsions and dispersions of said polymers which are suitable for impregnating or coating paper, textiles, fibers, wood or other porous or semi-porous materials to contribute such properties as strength, toughness, flexibility and impermeability to water. Furthermore, there may be obtained from said polymers, films and sheetings which are useful as transparent wrapping materials. The instant invention provides polymers which are adapted to molding by heat and pressure; and polymers with flowing characteristics such that they are well adapted to injection molding.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. An interpolymer of methacrylyl fluoride with methyl methacrylate, said interpolymer containing from 15% to 25% by weight of methacrylyl fluoride and from 85% to 75% by weight of methyl methacrylate.

2. An interpolymer of an alpha-methylene carboxylic acid fluoride selected from the group consisting of acrylyl and methacrylyl fluorides with methyl methacrylate, said interpolymer containing from 15% to 25% by weight of said alpha-methylene carboxylic acid fluoride and from 85% to 75% by weight of methyl methacrylate.

BENJAMIN W. HOWK.
RALPH A. JACOBSON.

REFERENCES CITED

The following references are of record in the file of this patent:

UNITED STATES PATENTS

| Number | Name | Date |
|---|---|---|
| 1,984,417 | Mark | Dec. 18, 1934 |
| 2,186,916 | Gaylor | Jan. 9, 1940 |
| 2,318,959 | Muskat | May 11, 1943 |
| 2,327,985 | Alderman | Aug. 31, 1943 |
| 2,334,476 | Coffman | Nov. 16, 1943 |